No. 845,098. PATENTED FEB. 26, 1907.
W. KITE.
BEET HARVESTER.
APPLICATION FILED DEC. 22, 1906.
2 SHEETS—SHEET 1.
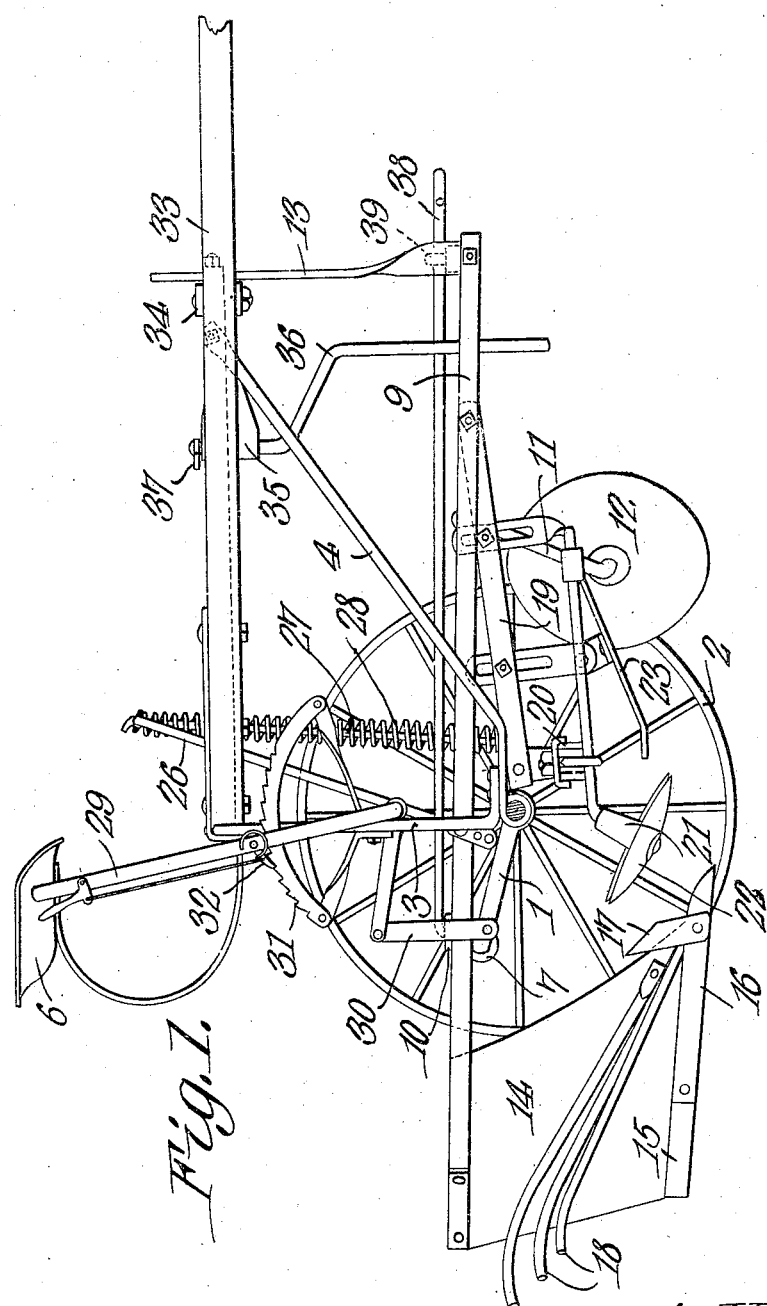
WITNESSES:
Willis Kite,
INVENTOR.
By C.A. Snow & Co.
ATTORNEYS

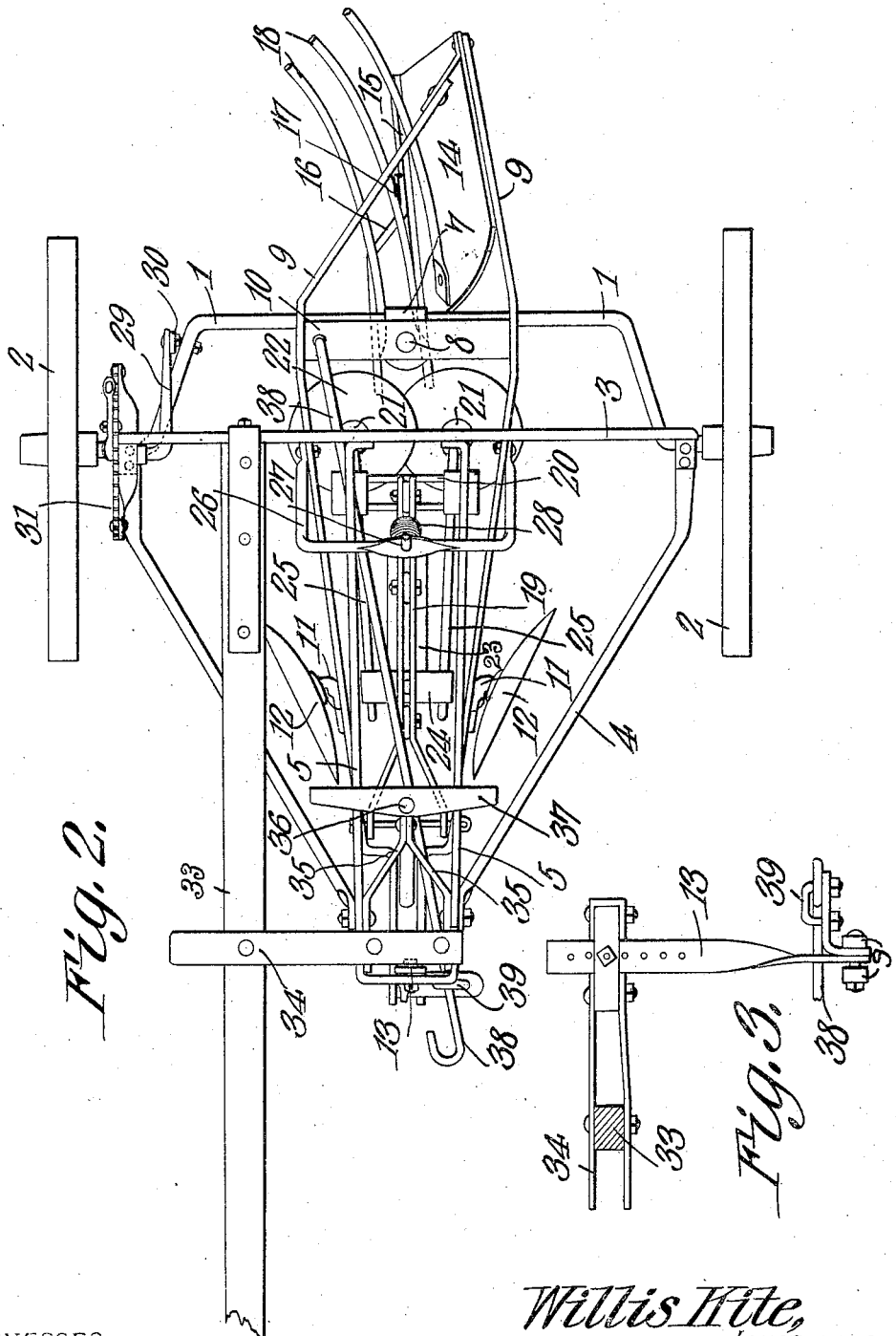

UNITED STATES PATENT OFFICE.

WILLIS KITE, OF LAS ANIMAS, COLORADO.

BEET-HARVESTER.

No. 845,098.      Specification of Letters Patent.      Patented Feb. 26, 1907.

Application filed December 22, 1906. Serial No. 349,107.

*To all whom it may concern:*

Be it known that I, WILLIS KITE, a citizen of the United States, residing at Las Animas, in the county of Bent and State of Colorado, have invented a new and useful Beet-Harvester, of which the following is a specification.

This invention has relation to beet-harvesters; and it consists in the novel construction and arrangement of its parts, as hereinafter shown and described.

The object of the invention is to provide a harvester of the character indicated, which consists of means for throwing the earth away from a row of beets, said means being followed by a means for removing the crowns and tops of the beets and the last said means being followed by a plow of special construction adapted to dig the beets from the ground, separate them from the soil, and deposit them upon the surface of the soil in the wake of the implement.

In the accompanying drawings, Figure 1 is a side elevation of the beet-harvester with parts removed. Fig. 2 is a top plan view of the harvester, and Fig. 3 is a front elevation of a forward portion of the harvester.

The implement comprises a U-shaped axle 1, at the ends of which are journaled the supporting-wheels 2 2. A frame is pivoted to the said axle just within the inner sides of the supporting-wheels 2. Said frame comprises the bridge portion 3 and the forwardly-extending portion 4. Said portion 4 is upwardly inclined toward its forward end, and the horizontal bars 5 connect the forward end of the portion 4 with the bridge 3 at intermediate points of the latter. The seat 6 is mounted between the bars 5 5 and is supported by the bridge 3. The collar 7 is upon the axle 1 and is provided with a pivot 8. A frame carrying the earth-cutters, top cutters, and plow is mounted upon the said pivot 8. Said frame comprises the beams 9, which are joined together at their ends and spread apart at their intermediate portions. The cross-piece 10 is between the intermediate portions of the said beams and is mounted upon the said pivot 8. The standards 11 depend from the forward portions of the beams 9 and are provided with the disks 12, journaled thereon. Said disks are disposed at an angle to each other and at an angle to the line of draft of the implement and are adapted to move the soil from the sides of the row of plants. The bar 13 is pivotally connected to the forward ends of the beams 9, and the upper portion of said bar is adjustably and pivotally attached to the forward end of the forwardly-extending portion 4 and is adapted to swing in transverse directions with relation to the implement. The moldboard 14 is attached to the rear end of one of the beams 9 and is provided at its lower edge with a bar 15. A supplemental bar 16 is attached to the side of the first said bar and is spaced from the same along its forward portions. The said bars are adapted to enter the ground and dig the roots from the same. The supplemental bar is provided with a substantially vertically-disposed colter 17, which is adapted to cut the tendrils from one side of the roots as they are dug from the ground. The sifting-bars 18 are rearwardly disposed and are attached to bar 15, supplemental bar 16, and moldboard 14 and are spaced apart sufficiently to permit the earth to pass through, but to prevent the rearward passage of the roots which when they strike the said sifting-bars are thrown to one side and deposited upon the surface of the ground.

A frame carrying the crown and top removing cutters is pivoted to the beams 9. Said frame consists of the bars 19, to the rear ends of which is attached the cross-piece 20. The spindles 21 depend from the ends of the cross-piece 20, and the substantially horizontally-disposed cutters are journaled upon the said spindles 21. The edges of the said cutters overlap. The shoe 23 is adjustably attached at its forward ends between the bars 19. The rear end of said shoe terminates just in advance of the cutters 22 and is adapted to regulate the depth in the ground at which the said cutters will operate upon the roots of the plants. The cross-piece 24 is attached at its middle to the shoe 23 and at its ends to the bars 25, which extend forward from the cross-piece 20. The yoke 26 is substantially vertically disposed and is attached at its ends to the beams 9. The rod 27 passes through a perforation provided at the upper intermediate portion of the said yoke. The lower end of the said rod is attached to the bars 19. The coil-spring 28 surrounds the rod 27 and bears at its lower end upon the upper edges of the bars 19 and at its upper end upon the under side of the yoke 26. Said spring is under tension and has a tendency to retain the bars 19 and their attachments in their lowermost position. The bell-crank lever 29 is fulcrumed to one of the vertical portions of the arch 3, and the link 30 connects the working end of the said lever with the intermediate portion of the axle 1. The gear-segment 31 is mounted upon the frame of the implement in the path of the pawl 32, carried by the lever 29. By moving the said lever it is obvious that the axle 1 may be turned toward the front or the rear and the rear ends of the beams 9 may be raised or lowered. Consequently the depth at which the cutters and the digging-plow may operate can be regulated to a nicety. The tongue 33 is fixed at its rear end to the bridge 3 of the frame, and at an intermediate point is connected, by means of the links 34, with the forward portion of the forwardly-extending portion of the frame. The bearing 35 is mounted between the bars 5, and the foot-lever 36 is journaled in the said bearing. The upper end of the said lever is provided with the laterally-disposed foot-pedals 37, and the lower end of said lever, which is in the form of a vertically-disposed crank, lies between the forward ends of the beams 9 9.

It is obvious that an operator sitting upon the seat 6 and having his feet upon the pedals 37 may swing the lever 36 horizontally, which in turn will move the forward ends of the beams 9 laterally and guide the earth-cutting disks, the top-removing disks, and the plow along the row of plants. A draft-rod 38 is fixed at its rear end to the cross-piece 10 and at its forward portion passes through an eye 39, located upon a laterally-extending lug attached to the forward ends of the beams 9. The draft-animal is hitched to the draft-rod, and by reason of the arrangement of the parts of the implement the said animal passes along the side of the row of plants while the diggers and cutters engage the plant. The tongue 33 is attached to the side of the animal and is for guiding the implement.

Having described my invention, what I claim as new, and desire to secure by Letters Patent, is—

1. A beet-harvester comprising a U-shaped axle mounted upon wheels, a frame superimposed upon the axle, means attached to the frame and connected with the axle for swinging the intermediate portion thereof, beams supported at their forward ends from the frame and at their rear portions by the intermediate portion of said axle, earth-cutters, beet-cutters and a plow carried by the said beams.

2. A beet-harvester comprising a U-shaped axle mounted upon wheels, a frame superimposed upon the axle, beams pivotally connected at their forward ends with said frame and being supported at their rear portions upon the axle, a foot-lever fulcrumed in the frame and engaging the forward portions of said beams and earth-cutters, beet-cutters and a plow carried by the beams.

3. A beet-harvester comprising a U-shaped axle mounted upon wheels, a frame superimposed upon the axle, means mounted upon the frame and being connected with the axle for swinging the intermediate portion thereof, beams pivotally connected at their forward ends with the frame and being supported at their rear portions upon the intermediate portion of the said axle, a foot-lever fulcrumed to the frame and engaging said beams and earth-cutters, beet-cutters and a plow carried by the said beams.

4. A beet-harvester comprising a U-shaped axle mounted upon wheels, a frame superimposed above the axle, means mounted upon the frame and connected with the axle for swinging the intermediate portion thereof, beams pivotally connecting at their forward ends with the frame and being supported at their rear portions upon the axle, a foot-lever journaled upon the frame and engaging said beams, cutters carried by the beams, a plow also carried by the beams, bars pivoted between the beams and horizontally-disposed overlapping cutters carried by said bars.

5. A beet-harvester comprising a U-shaped axle mounted upon wheels, a frame superimposed above the axle, means carried by the frame and connected with the axle for swinging the intermediate portion thereof, beams pivotally connected at their forward ends with said frame and being supported at their rear portions by said axle, earth-cutters, beet-cutters and a plow carried by the beam, a foot-lever fulcrumed upon the frame and engaging the forward portions of said beam, a tongue attached at its rear end to the frame and being connected at an intermediate point with the forward end of the frame, a draft-rod attached at its rear end to a cross-piece carried by the beams and passing at its forward portion through an eye located at the forward ends of the beam.

In testimony that I claim the foregoing as my own I have hereto affixed my signature in the presence of two witnesses.

WILLIS KITE.

Witnesses:
JOHN J. COOPER,
W. F. ELKIN.